UNITED STATES PATENT OFFICE.

UPHAM S. TREAT, OF EASTPORT, MAINE.

IMPROVEMENT IN FERTILIZERS FROM SEA-WEEDS.

Specification forming part of Letters Patent No. 118,987, dated September 12, 1871.

*To all whom it may concern:*

Be it known that I, UPHAM S. TREAT, of Eastport, in the county of Washington and State of Maine, have invented a new and useful Improvement in Fertilizers; and I do hereby declare that the following is a full, clear, and exact description thereof, which will enable others skilled in the art to make and use the same.

The object of this invention is to furnish cultivators of the soil with a fertilizer rich in phosphate and other desirable qualities; and it consists in so treating sea-weed that a most valuable fertilizer is formed therefrom.

In carrying out my invention and discovery I subject the sea-weed to the action of steam under pressure until it is reduced to a pulp. It is then passed through a mill, where it is thoroughly mixed with ten per cent., more or less, of finely powdered quicklime. After being thus mixed it is elevated or placed in some suitable place to be thoroughly aired and dried, when it is ready for packing in barrels and for market.

I do not confine myself to the particular quantity of quicklime above named, but may use more or less, as may be found expedient.

Upon the Atlantic coast sea-weed is a most abundant article, used at present to some extent as a fertilizer in combination with barn-yard or other manure; but its valuable qualities seem to be dissipated and in a great measure lost by exposure to the atmosphere in its crude state, or from not securing proper chemical treatment. By my process all its native richness is preserved and a hitherto almost useless weed is converted into an efficient compound for enriching the soil.

Having thus described my invention, I claim as new and desire to secure by Letters Patent—

As a new and improved article of manufacture and commerce, a fertilizer formed substantially in the manner described.

UPHAM S. TREAT.

Witnesses:
ALLEN N. STAPLES,
FRANK TREAT.